(12) United States Patent　(10) Patent No.: US 7,532,285 B2
Nagai et al.　(45) Date of Patent: May 12, 2009

(54) LCD DEVICE REDUCING ASYMMETRY IN THE LEAKAGE LIGHT

(75) Inventors: Hiroshi Nagai, Kanagawa (JP); Hidenori Ikeno, Kanagawa (JP)

(73) Assignee: NEC LCD Technologies, Ltd. (JP)

( * ) Notice: Subject to any disclaimer, the term of this patent is extended or adjusted under 35 U.S.C. 154(b) by 567 days.

(21) Appl. No.: 11/227,844

(22) Filed: Sep. 15, 2005

(65) Prior Publication Data

US 2006/0072056 A1　Apr. 6, 2006

(30) Foreign Application Priority Data

Oct. 5, 2004　(JP) ............................. 2004-292646

(51) Int. Cl.
*G02F 1/1335* (2006.01)
(52) U.S. Cl. ..................... 349/117; 349/118; 349/134
(58) Field of Classification Search ................. 349/117, 349/96, 106, 118, 141, 134, 123, 132
See application file for complete search history.

(56) References Cited

U.S. PATENT DOCUMENTS 5,883,685 A * 3/1999 Mazaki et al. .............. 349/117
6,061,116 A * 5/2000 Nishida et al. ............. 349/130

FOREIGN PATENT DOCUMENTS

JP　2002-55341　2/2002

* cited by examiner

*Primary Examiner*—Thoi V Duong
(74) *Attorney, Agent, or Firm*—Hayes Soloway P.C.

(57) ABSTRACT

An LCD device includes therein a splay-oriented LC layer, first and second substrates sandwiching therebetween the LC layer, and an optical compensation film for reducing leakage light upon display of a black color. The optical compensation film has three optical elastic axes including a fast axis coinciding the Y-axis, a slow axis rotated from the X-axis by a positive rotational angle θ 1, and another axis rotated from the Z-axis by the positive rotational angle θ 1. The positive rotational direction coincides with a counter-clockwise direction within the substrate surface, as viewed from minus side toward the positive side of the Y-axis.

8 Claims, 15 Drawing Sheets

Isoluminance contour

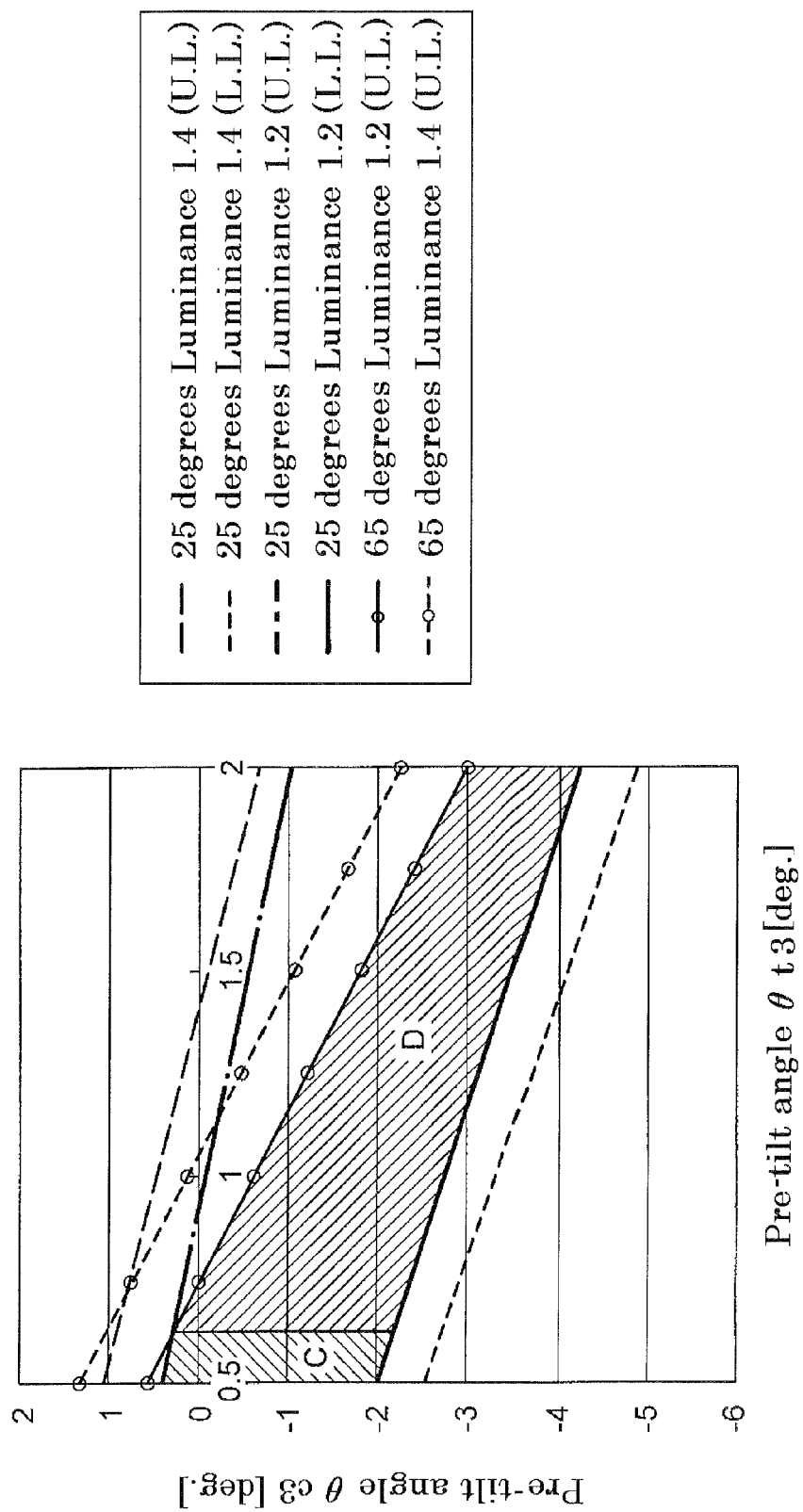

Isoluminance contour

Isoluminance contour

LCD DEVICE REDUCING ASYMMETRY IN THE LEAKAGE LIGHT

BACKGROUND OF THE INVENTION (a) Field of the Invention

The present invention relates to a liquid crystal display (LCD) device and, more particularly, to an in-plane-switching (IPS) mode LCD device, which is capable of reducing asymmetry in the leakage light on the screen of the LCD device.

(b) Description of the Related Art

In general, an in-plane-switching (IPS) mode LCD device includes a liquid crystal (LC) layer, a pair of substrates sandwiching therebetween the LC layer, and a pair of polarizing films each attached is with a corresponding one of the substrates on the outer side thereof. In the IPS mode LCD device, the initial orientation of the LC molecules in the LC layer is determined so that the screen of the LCD device represents a black color when no voltage is applied onto the LC layer, and so that the screen represents a white color when a specific voltage is applied onto the LC layer to thereby turn the orientation of the LC molecules therein by about 45 degrees. The IPS mode LCD device generally achieves a higher viewing angle compared to a twisted-nematic (TN) mode LCD device because the rotational direction of the LC molecules is parallel to the substrates in the IPS mode LCD device.

It is known in the IPS mode LCD device that a leakage light appears when the LCD device is observed in an oblique direction upon display of a black color on the screen. Patent Publication JP-A-2002-55341 describes a technique for suppressing the leakage light in the IPS mode LCD device. In this technique, a retardation film or optical compensation film is used for compensating the retardation of the LC layer to thereby suppress the leakage light, the retardation film having a retardation opposite to the retardation of the LC layer and an optical axis slanted to the direction same as the tilting direction of the LC molecules.

In the IPS mode LCD device, although the LC is homogeneously oriented in the direction parallel to the substrates, the LC layer has in fact a pre-tilt angle at each of the boundaries between the same and the orientation film of the TFT (thin-film-transistor) substrate and between the same and the orientation film of the color-filter (CF) substrate. This pre-tilt angle causes the user to observe different amounts of leakage light in the LCD device depending on the viewing angles although the difference itself therebetween is relatively small, because the different viewing angles provide different leakage states.

FIG. 16A shows an example of the orientation of the LC molecules in an IPS mode LCD device having an anti-parallel-oriented LC layer. FIG. 16B shows the orientation of the LC as viewed from the front of the LCD device. As shown in FIG. 16A, the longer optical axes 202 of the LC molecules 201 have a pre-tilt angle $\theta t11$ on the surface of the TFT substrate 102, whereas the longer optical axes 202 of the LC molecules 201 have a pre-tilt angle $\theta c11$ on the surface of the CF substrate 104. The magnitude of the pre-tilt angle $\theta t11$ is equal to the magnitude of the pre-tilt angle $\theta c11$, whereas the rising direction of the LC molecules 201 on the TFT substrate 102 is opposite to the rising direction of the LC molecules 201 on the CF substrate 104.

FIG. 17 shows a luminance viewing cone calculated by a simulation upon display of a black color in the anti-parallel-oriented LCD device. The directions adopted in the luminance viewing cone are such that the Z-axis in FIG. 16A is assumed as the front direction, or at a polar angle of zero degree, the Y-axis in FIG. 16B is assumed at an azimuth angle of zero degree. The viewing cone of FIG. 17 shows the luminance levels of the leakage light as observed upon display of the black color, by using iso-luminance contour lines, for the azimuth angle of zero to 360 degrees and for the polar angle of zero to 80 degrees. In the simulation used for obtaining the luminance viewing cone, the pre-tilt angle is assumed as $|\theta t11|=|\theta c11|=1.5$ degrees, whereas the rising direction of the LC molecules is assumed as the positive direction of the X-axis on the TFT substrate and as the negative direction of the X-axis on the CF substrate.

FIG. 18 shows the relationship between the polar angle and the normalized luminance in the directions at azimuth angles of 25/205 degrees (shown by solid line) and at azimuth angles of 65/245 degrees (shown by dotted line). In this figure, the maximum luminance shown in FIG. 17 is used for normalization of the calculated luminances. Assuming that the direction at an azimuth angle of 25 degrees is a plus side of the graph and the direction at an azimuth angle of 205 degrees is a minus side, the peak luminance of the leakage light shown by a solid curve (a) on the plus side is far larger than the peak luminance of the leakage light on the minus side in the direction at the azimuth angles of 25/205 degrees. Assuming that the direction at an azimuth angle of 65 degrees is a plus side of the graph and the direction at an azimuth angle of 245 degrees is a minus side, the peak luminance of the leakage light shown by a dotted curve (b) on the minus side is far greater than, i.e., double, the peak luminance on the plus side in the direction at azimuth angles of 65/245 degrees.

In the anti-parallel orientation of the LC layer, the rising direction of the LC molecules is opposite between the TFT substrate side and the CF substrate side, as shown in FIG. 16A. This causes different observed images of the LC molecules between the cases of the LC panel being obliquely observed from the bottom side and from the top side along the X-axis, if the LC molecules are aligned in the X-axis, as shown in FIG. 16B. As a result, the luminance upon display of a black color is asymmetric between the top-side view and the bottom-side view, as shown in FIGS. 17 and 18, which degrades the overall image quality of the LCD device.

FIG. 19 shows orientations of LC molecules in a splay-oriented mode LCD device. In the splay-oriented mode LCD device, the LC molecules 201 have a pre-tilt angle $\theta t22$ on the TFT substrate and a pre-tilt angle $\theta c22$ on the CF substrate. The orientations of the splay-oriented mode LCD device are such that one of the rising directions of the LC molecules on the TFT substrate and the CF substrate is rotated by 180 degrees in the anti-parallel orientations whereby the rising directions of the LC molecules on the TFT substrate and the CF substrate are the same direction as observed from the front. This configuration of the splay-oriented mode LCD device reduces the difference in the observed image of the LC molecules between the cases of the LC panel being obliquely observed from the top side and the bottom side along the X-axis, thereby reducing the asymmetry. in the luminance-to-viewing angle characteristic between the top side view and the bottom side view. This provides a solution for the top-bottom asymmetry problem involved with the anti-parallel orientation mode LCD device.

FIG. 20 shows a luminance viewing cone upon display of a black color in a splay-oriented mode LCD device, obtained by a simulation. In FIG. 20, as is the case shown in FIG. 17, the Z-axis is assumed at a polar angle of zero degree, the Y-axis is assumed at an azimuth angle of zero degree, wherein the luminance of the leakage light upon display of the black color is shown by iso-luminance contour lines for the azimuth angle of zero to 360 degrees and for the polar angle of zero to 80 degrees. In this simulation, it is assumed that an LCD device has a pre-tilt angle of |θ t22|=|θ c22|=0.5 degrees, and the rising direction of the LC molecules on both the TFT substrate and the CF substrate is along the positive direction of the X-axis.

FIG. 21 shows the relationship between the polar angle and luminance in the directions of the azimuth angles of 25/205 degrees and azimuth angles of 65/245 degrees. In FIG. 21, graph (a) shows the relationship between the polar angle and the normalized luminance in the direction of the azimuth angles of 25/205 degrees, whereas graph (b) shows the relationship between the polar angle and the normalized luminance in the direction of the azimuth angles of 65/245 degrees. For example, the ratio of the peak luminance in the minus side (bottom side) in the azimuth direction of 60/245 degrees to the peak luminance in the plus side (top side) is about 1.35:1. Comparing the graphs of FIG. 21 with the graphs of FIG. 18, it will be understood that the splay-oriented mode LCD device has a better top-bottom symmetry than the anti-parallel mode LCD device, due to the small difference between the peak luminance in the top side and the peak luminance in the bottom side in the splay-orientated mode LCD device.

It should be noted that although the observer scarcely perceives the viewing angle dependency of the leakage light if the leakage light has a higher luminance upon display of a black color, the observer perceives a relatively strong viewing angle dependency of the leakage light if the leakage light itself has a smaller luminance due to, for example, use of an optical compensation film to suppress the total level of the leakage light. This is because the observer can generally perceive a small difference in the suppressed level of the leakage light. That is, the reduction of the leakage light rather degrades the image quality of the LCD device based on the viewing angle dependency of the luminance of the leakage light. Thus, the improvement in the symmetry of the leakage light achieved in the splay-oriented mode LCD device is not sufficient, and it is required to further improve the image quality in the splay-oriented mode LCD device.

SUMMARY OF THE INVENTION

In view of the above problem in the conventional LCD device, it is an object of the present invention to provide an LCD device which is capable of suppressing the leakage light, and also reducing the asymmetry of the leakage light upon display of a black color, to thereby improve the image quality of the LCD device.

The present invention provides, in a first aspect thereof, a liquid crystal display (LCD) device including a liquid crystal (LC) layer, first and second substrates sandwiching therebetween the liquid crystal layer, and an optical compensation film disposed adjacent to the second substrate, wherein:

the first substrate mounts thereon electrodes for applying to the LC layer an electric field parallel to the first substrate;

the LC layer has a twisted angle of substantially zero degree, and includes LC molecules which have longer optical axes extending parallel to the first substrate;

the LC layer has a positive pre-tilt angle θ p1 on a substrate surface of the first substrate and a negative pre-tilt angle −θ p1 on a substrate surface of the second substrate;

the optical compensation film has three optical elastic axes including a fast axis extending along a Y-axis, a slow axis extending along a direction which is rotated from an X-axis by a positive rotational angle θ s, and another axis extending along a thickness direction of the optical compensation film which is rotated from a Z-axis by the positive rotational angle θ s; and the X-axis has a positive direction which substantially coincides with a projection of a rising direction of the longer optical axes of the LC molecules rising from the substrate surfaces upon display of a black color, the projection being projected on one of the substrate surfaces, the Y-axis has a positive direction which substantially coincides with a direction rotated from the X-axis by an angle of 90 degrees in a counter-clockwise direction as viewed from a front side of the LCD device, the Z-axis has a positive direction which substantially coincides with a direction as viewed normal to the substrate surfaces from the first substrate toward the second substrate, and the positive rotational direction coincides with a counter-clockwise direction as viewed from a negative side of the Y-axis toward a positive side of the Y-axis.

In the LCD device of the first aspect of the present invention, since the slow axis and the axis in the thickness direction are rotated by the positive rotational angle θ s with respect to the fast axis or the Y-axis, the difference in the retardation caused by the pre-tilt angle of the LC molecules between the top side and the bottom side can be reduced, thereby reducing the asymmetry in the viewing angle characteristic.

The present invention provides, in a second aspect thereof, a liquid crystal display (LCD) device including a liquid crystal (LC) layer, first and second substrates sandwiching therebetween the liquid crystal layer, and an optical compensation film disposed adjacent to the second substrate, wherein:

the first substrate mounts thereon electrodes for applying to the LC layer an electric field parallel to the first substrate;

the LC layer has a twisted angle of substantially zero degree, and includes LC molecules which have longer optical axes extending parallel to the first substrate;

the LC layer has a positive pre-tilt angle θ p2 on a substrate surface of the first substrate and a negative pre-tilt angle θ p3 on a substrate surface of the second substrate;

the optical compensation film has three optical elastic axes including a fast axis extending along a Y-axis, a slow axis extending along an X-axis, and another axis in a thickness direction of the optical compensation film extending along a Z-axis; and the X-axis has a positive direction which substantially coincides with a projection of a rising direction of the longer optical axes of the LC molecules rising from the substrate surfaces upon display of a black color, the projection being projected on one of the substrate surfaces, the Y-axis has a positive direction which substantially coincides with a direction rotated from the X-axis by an angle of 90 degrees in a counter-clockwise direction as viewed from a front side of the LCD device, the Z-axis has a positive direction which substantially coincides with a direction as viewed normal to the substrate surfaces from the first substrate toward the second substrate, and the positive rotational direction coincides with a counter-clockwise direction as viewed from a negative side of the Y-axis toward a positive side of the Y-axis.

In the LCD device of the second aspect of the present invention, the pre-tilt angle of the LC molecules on the first substrate is different from the pre-tilt angle on the second substrate. Thus, assuming that the LC molecules existing from the first substrate to the second substrate are overlapped on a single plane, the optical elastic axis of the LC layer is deviated from the direction of the Z-axis by an angle corresponding to the difference between the positive pre-tilt angle and the negative pre-tile angle. This reduces the difference of the retardation between the top side and the bottom side, thereby reducing the asymmetry in the viewing angle characteristic.

In accordance with the LCD device of the present invention, the specific configuration of the optical compensation film reduces the difference of the retardation caused by the pre-tile angle of the LC layer between the top side and the bottom side. Thus, the asymmetry in the viewing angle characteristic can be reduced, thereby improving the contrast-to-viewing angle characteristic of the LCD device.

The above and other objects, features and advantages of the present invention will be more apparent from the following description, referring to the accompanying drawings.

BRIEF DESCRIPTION OF THE DRAWINGS

FIG. 15 is a graph obtained by overlapping on a plane the results shown in FIG. 13 and the results shown in FIG. 14.

PREFERRED EMBODIMENT OF THE INVENTION

Figure 1:
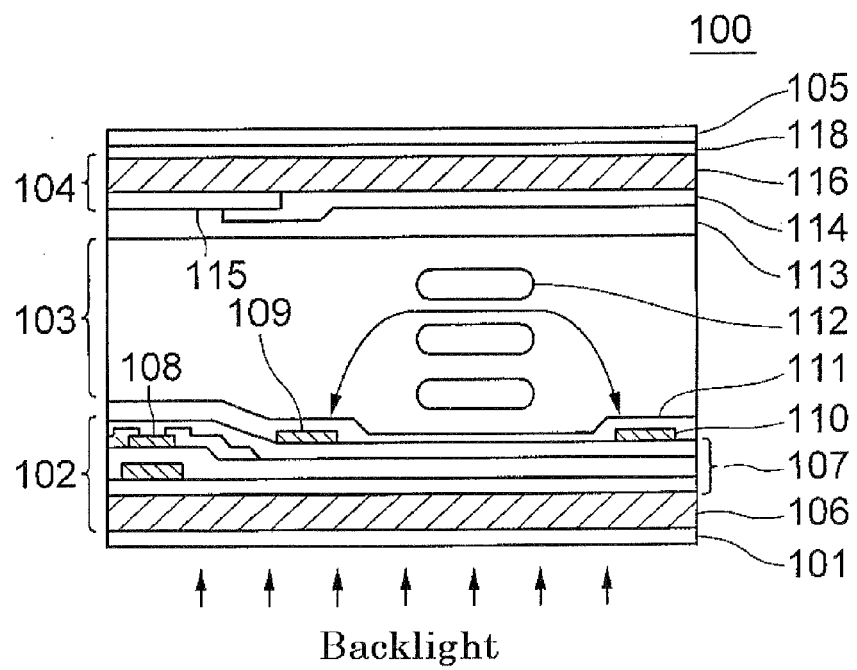
FIG. 1 is a sectional view of an LCD device according to a first embodiment of the present invention.

Now, the present invention is more specifically described with reference to accompanying drawings, wherein similar constituent elements are designated by similar or related reference numerals throughout the drawings.

FIG. 1 shows an LCD device according to a first embodiment of the present invention. The LCD device, generally designated by numeral 100, is implemented as an IPS mode LCD device, and includes a light-incident-side (first) polarizing film 101, a TFT substrate 102, an orientation film 111, an LC layer 103, an orientation film 113, a CF substrate 104, an optical compensation film 118, and a light-emitting-side (second) polarizing film 105, which are arranged in this order as viewed from a backlight unit (not shown) toward the front side of the LCD device.

Figure 2:
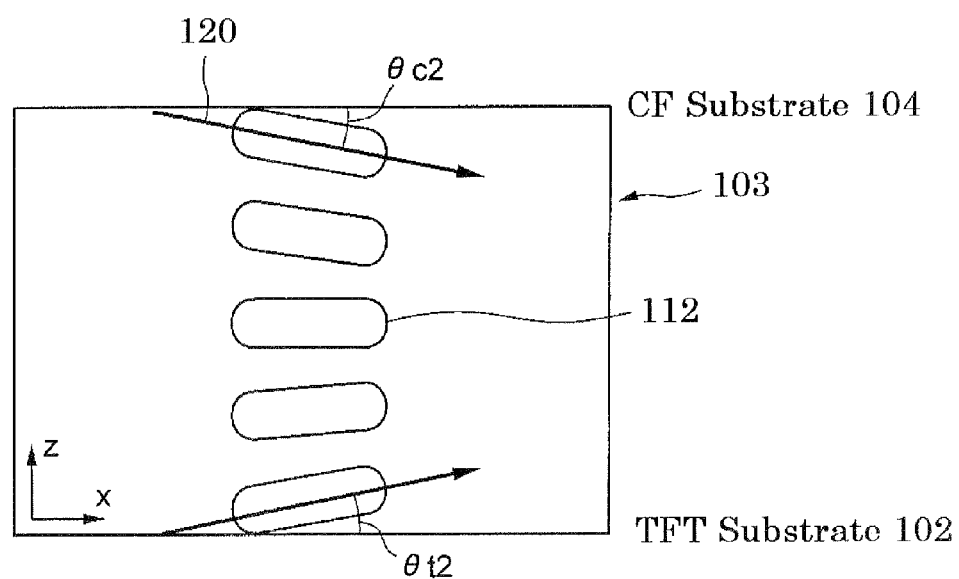
FIG. 2 is schematic sectional view of the LCD device of FIG. 1 for showing the pre-tilt angles of the LC molecules.

The LC layer 103 includes therein splay-oriented LC molecules 112 having a twisted angle of about zero degree. FIG. 2 shows the orientations of the longer optical axes 120 of the LC molecules 112 in the LC layer 103. The pre-tilt angle used herein conforms to the definition as detailed below, wherein the direction parallel to the substrates 102 and 104 is at zero degree, the rising direction of the LC molecules 112 having longer optical axes 120 rotated in the counter-clockwise direction from the substrate surface is positive, and the rising direction of the LC molecules 112 having longer optical axes 120 rotated in the clockwise direction from the substrate surface. is negative. As shown in FIG. 2, the LC molecules 112 rise from the surface of the TFT substrate 102 in the positive rotational direction to a pre-tilt angle $\theta$ t2 ($0<\theta$ t2$<2$ degrees) due to the function of the orientation film 111, and rise from the surface of the CF substrate 104 in the negative rotational direction to a pre-tilt angle $\theta$ c2 due to the function of the orientation film 113, wherein the relationship $|\theta$ t2$|=|\theta$ c2$|$ holds.

Figure 3:
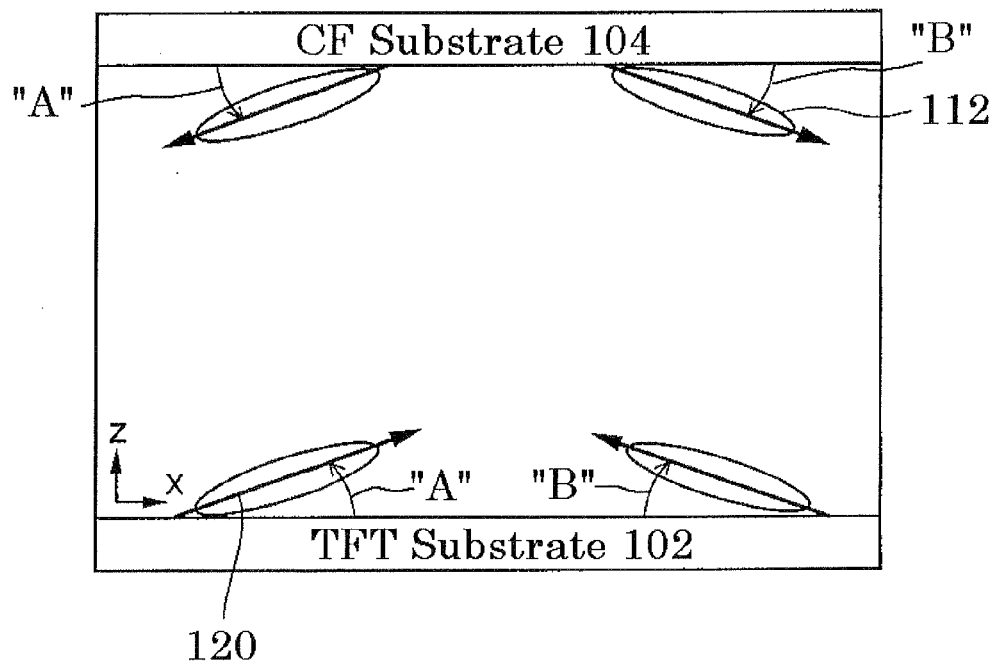
FIG. 3 is a schematic sectional view of the LCD device of FIG. 1 for showing definition of the positive and negative rotational angles.

FIG. 3 shows the XYZ coordinate system of the LCD device of FIG. 1, determining the positive and negative rotational angles as used above. The X-axis has a positive direction directed toward right in the drawing parallel to the substrates 102 and 104, the Y-axis has a positive direction which coincides with a direction rotated from the X-axis by an angle of 90 degrees in a counter-clockwise direction as viewed from the front side of the LCD, i.e, as viewed from the CF substrate 104 toward the TFT substrate 102, and the Z-axis has a positive direction which coincides with a direction as viewed normal to the substrate surfaces from the TFT substrate 102 toward the CF substrate 104. The positive rotational direction coincides with a counter-clockwise direction "A" as viewed from a negative side of the Y-axis toward the positive side of the Y-axis. The negative rotational direction coincides with a clockwise direction "B" as viewed from the negative side of the Y-axis toward a positive side of the Y-axis.

Back to FIG. 1, the TFT substrate 102 includes a glass substrate body 106 mounting thereon an insulation film 107, an array of TFTs 108 which are associated with respective pixel electrodes 109, and a counter electrode 110. The TFT 108 controls the potential applied to the corresponding pixel electrode 109. The CF substrate 104 includes a glass substrate body 116 mounting thereon color layers 114 and a shield film pattern 115. The color layer 114 colors the light passed by the LC layer 103 with one of primary colors, i.e., red, green and blue. The shield film pattern 115 shields the TFTs 108 and data lines etc. (not shown) against the light. In the LCD device 100, a lateral electric field is applied to the LC molecules 112 due to the potential difference between the pixel electrode 109 and the counter electrode 110, to thereby control the transmission of light through the LC layer 103 and represent an image on the screen.

Figure 4:
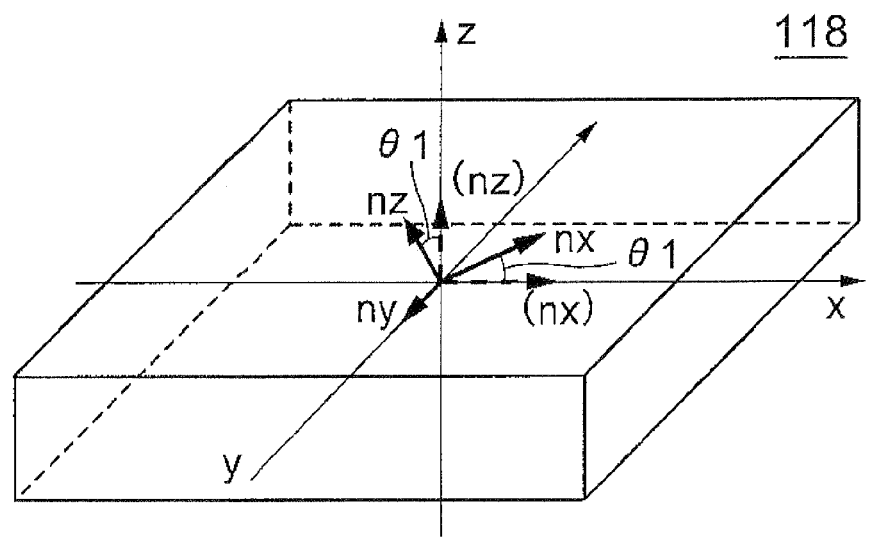
FIG. 4 is a schematic perspective view of the optical compensation film shown in FIG. 1 for showing the optical characteristics thereof.

The optical compensation film 118 has a function of suppressing the leakage light upon display of a black color on the screen due to the specific optical characteristics thereof. FIG. 4 schematically shows the optical characteristics of the optical compensation film 118. In FIG. 4, the direction of the X-axis coincides with the direction of the longer optical axes of the LC molecules projected onto the substrate surface, the direction of the Y-axis coincides with the direction normal to the X-axis within the substrate surface, and the Z-axis is normal to the substrate surface. In each of the X-, Y- and Z-axes, the positive direction is shown by an arrow in the drawing.

The optical compensation film 118 has three optical elastic axes denoted by nx, ny and nz in the drawing. In this text, the refractive indexes of these optical axes may also be referred to as nx, ny and nz. The optical elastic axis ny known as a fast axis coincides with the Y-axis, the optical elastic axis nx known as a slow axis coincides with the direction at an angle $\theta 1$ rotated away from the X-axis in the positive direction, which is a counter-clockwise direction in the X-Y plane as viewed from the positive direction of the Y-axis, and the optical elastic axis nz coincides with the direction of an angle $\theta 1$ rotated in the positive rotational direction from the direction of the Z-axis. Thus, the optical elastic axes of the optical compensation film 118 are such that the optical elastic axes nx and nz coincide with the direction rotated by $\theta 1$ from the X- and Z-axes, respectively, with the Y-axis being the rotational axis.

Simulations were conducted for the above LCD device, to thereby obtain the range of combinations of the pre-tilt angle of the LC molecules 112 and the rotational angle $\theta 1$ of the slow axis etc. of the optical compensation film 118, the combinations achieving effective suppression of the asymmetry of the leakage light to a desired level.

Prior to these simulations, the level of the leakage light below which the image quality is scarcely degraded by the leakage light in an oblique view was obtained by an experiment, followed by another experiment for obtaining the ratio of the peak luminance of the leakage light between the opposite directions, below which the asymmetry of the leakage light is not perceived by the observer.

With respect to the luminance of the leakage light in the oblique view, a typical IPS mode LCD device having no optical compensation film was used in an experiment for determining the level of the leakage light at which the image quality was not degraded by the leakage light in the oblique view, while gradually lowering the luminance of the backlight in the IPS mode LCD device. This revealed that a half of the normal luminance of the backlight unit does not significantly degrade the image quality of the LCD device in the oblique view, and that a quarter of the normal luminance allowed the observer to scarcely perceive the leakage light in the oblique view.

Thus, the luminance of the leakage light of the normal IPS mode LCD device observed in the oblique view was adopted as the reference luminance, and half the reference luminance was adopted as the level at which the leakage light does not significantly degrade the image quality. The oblique direction selected herein was at an azimuth angle of 45 degrees away from the polarizing axis of the polarizing film.

With respect to the asymmetry of the leakage light in the oblique view, a prototype LC panel was manufactured which had an arrangement of optical axes designed to have different luminances between the opposite directions. The ratio of the luminance between the opposite directions at which the luminance difference was not perceived any more was obtained by an experiment observing the LC panel with human eyes. This experiment revealed that a ratio of 1.2:1 or below in the peak luminance between the opposite directions was sufficient for the observer to disregard the asymmetry.

Figure 5:
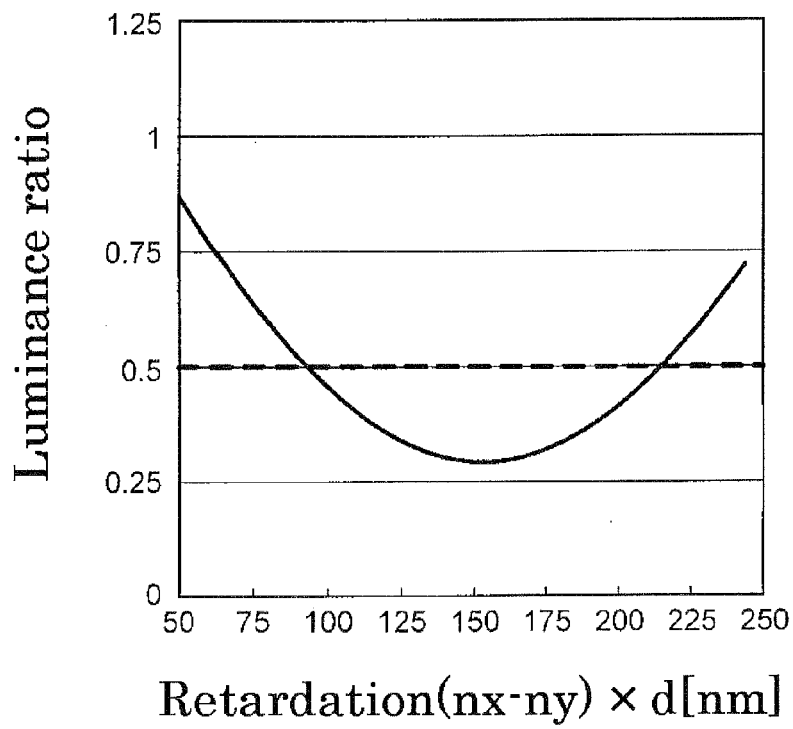
FIG. 5 graphically shows the relationship between the retardation of the optical compensation film and the asymmetry of the leakage light upon display of a black color.

FIG. 5 shows the relationship obtained by a simulation between the retardation, (nx−ny)×d, of the optical compensation film 118 and the luminance ratio of the leakage light, with the rotational angle $\theta 1$ being fixed at zero degree. In this simulation, an optical compensation film having an optical characteristic of 0<(nx−nz)/(nx−ny)≦0.5 was used. In FIG. 5, the luminance ratio plotted on ordinate is the ratio of the amount of leakage light observed in the oblique view from an LCD device having the optical compensation film 118 to the amount of leakage light observed in the oblique view from a normal IPS mode LCD device having no optical compensation film 118. As understood from FIG. 5, an optical compensation film having a retardation (nx−ny)×d satisfying the relationship 94 nm≦(nx−ny)×d≦214 nm allows the luminance ratio of the leakage light equal to or below 0.5, thereby allowing the leakage light to be disregarded.

Figure 6:
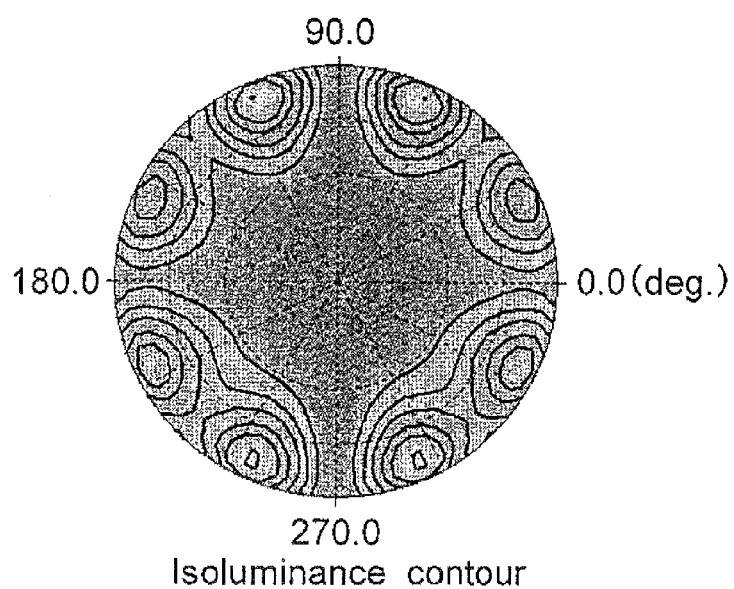
FIG. 6 shows a luminance viewing cone obtained by a simulation for the LCD device of FIG. 1.
Figure 7:
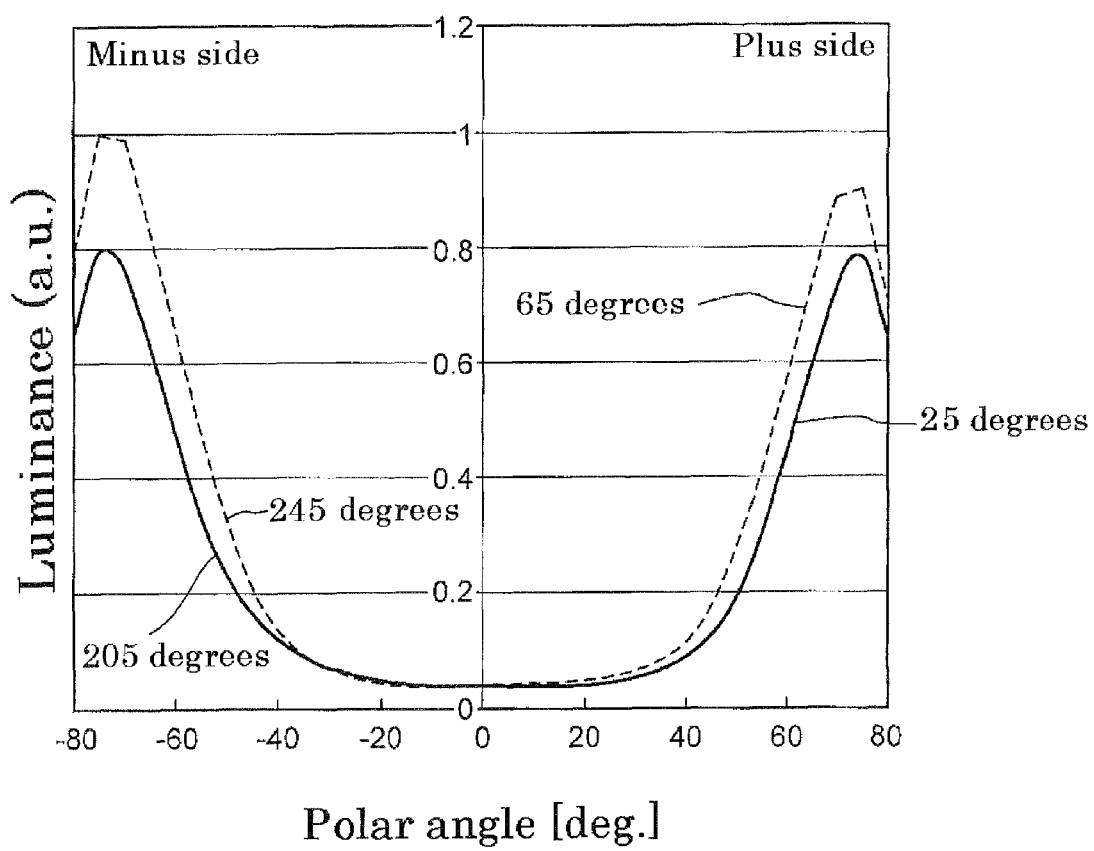
FIG. 7 graphically shows the relationship between the polar angle and the luminance in the directions of specific azimuth angles.
Figure 17:
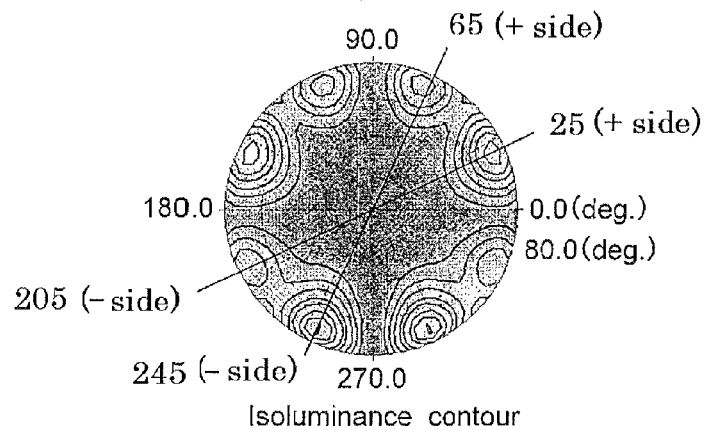
FIG. 17 shows a luminance viewing cone upon display of a black color in the LCD device of FIG. 16A, obtained by a simulation.
Figure 18:
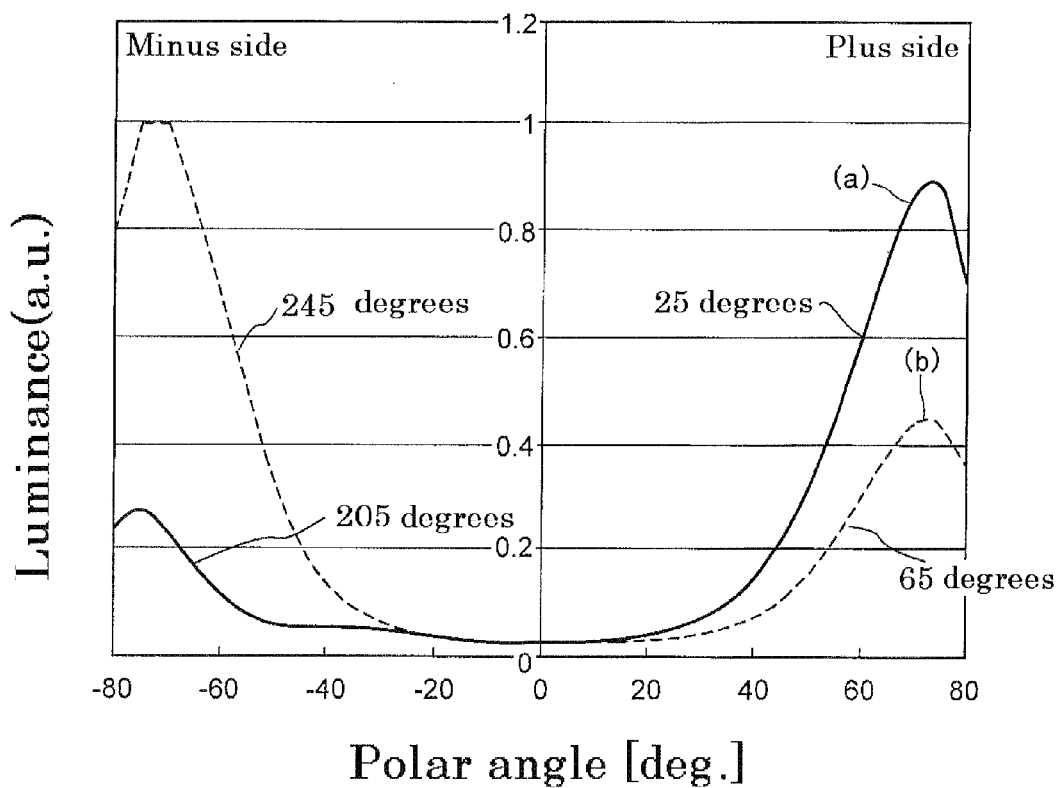
FIG. 18 graphically shows the relationship between the polar angle and the luminance in the directions of specific azimuth angles, obtained by simulation for the LCD device of FIG. 16A.
Figure 19:
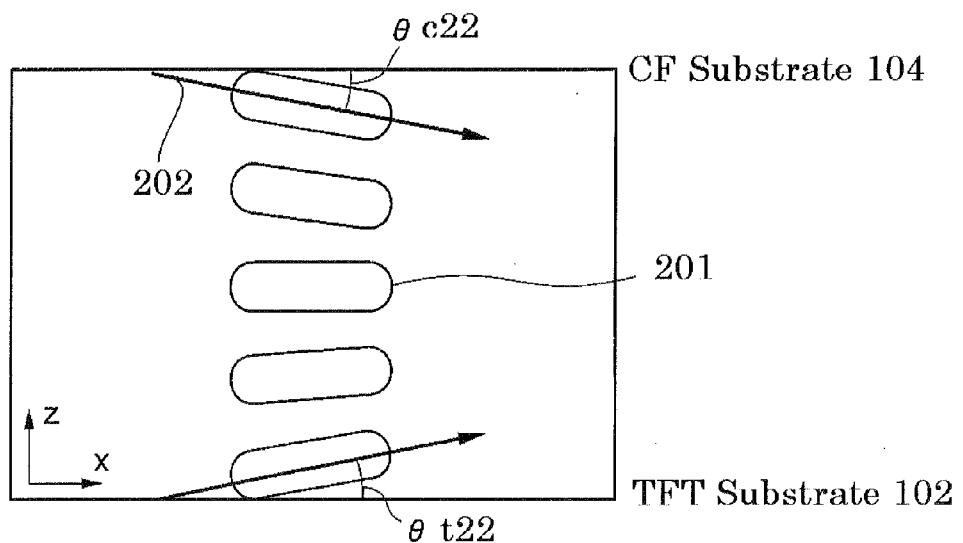
FIG. 19 is a schematic sectional view of a conventional LCD device having a splay-oriented LC layer.
Figure 20:
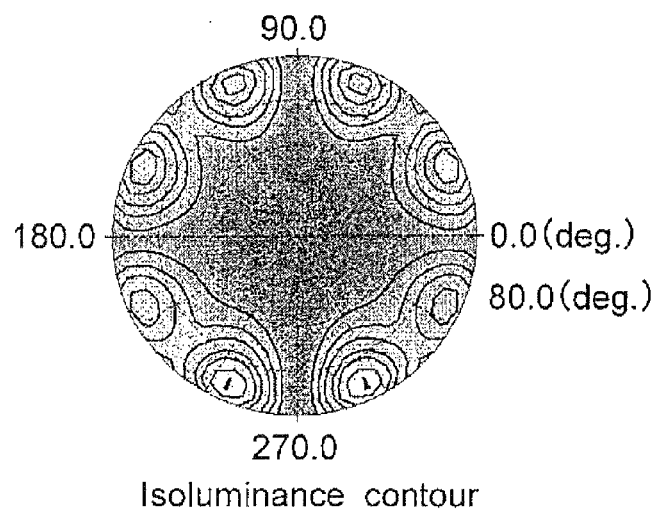
FIG. 20 shows a luminance viewing cone upon display of a black color in the LCD device of FIG. 19.
Figure 21:
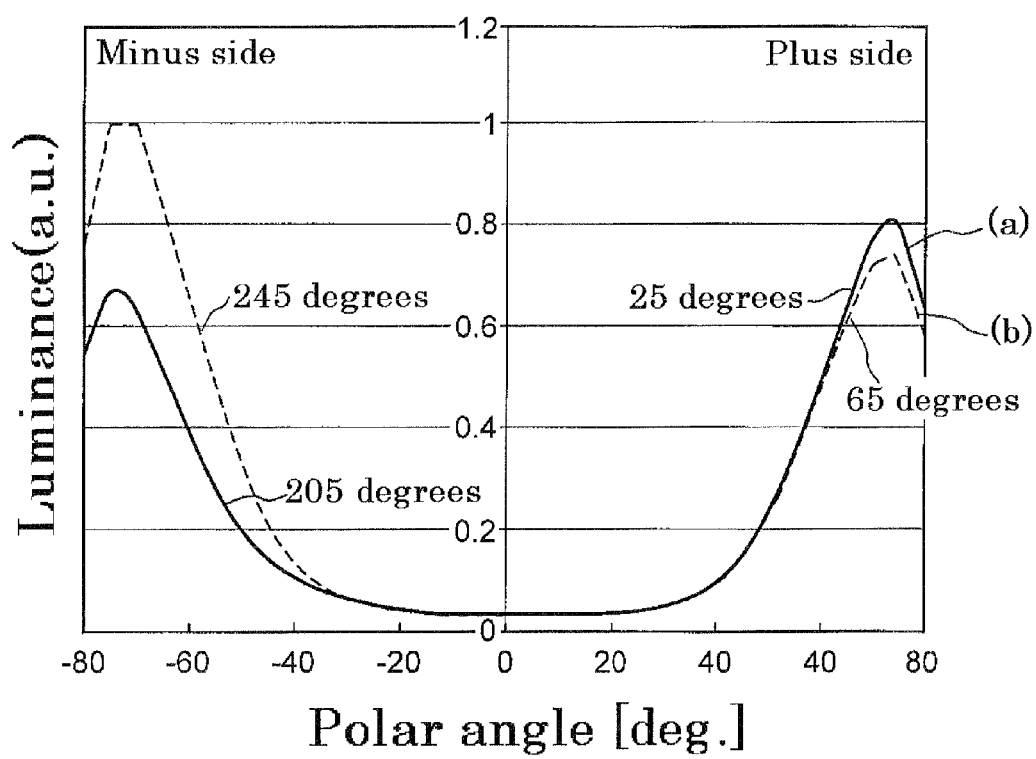
FIG. 21 graphically shows the relationship between the polar angle and the luminance in the direction of specific azimuth angles in the conventional LCD device.

FIG. 6 shows a luminance viewing cone representing luminance of the leakage light upon display of a black color, obtained by a simulation. In this simulation, it is assumed that the pre-tilt angle $\theta c2$ is −1.5 degrees and the rotational angle $\theta 1$ of the slow axis of he optical compensation film 118 is 1.5 degrees. In FIG. 6, the luminance of the leakage light upon display of the black color is shown by iso-luminance contour lines for the azimuth angle of zero to 360 degrees and for the polar angle of zero to 80 degrees, similarly to FIG. 17. FIG. 7 shows the relationship between the polar angles and the normalized luminance in the directions of azimuth angles of 25/205 degrees and azimuth angles of 65/245 degrees. In FIG. 7, the calculated luminance is normalized by the maximum luminance in the luminance distribution diagram of FIG. 6.

As shown in FIG. 6, the luminance distribution is bilaterally symmetric with respect to the center line extending in the direction of lo azimuth angles of 90/270 degrees. In addition, a peak luminance of the leakage light appears around the azimuth angles of 25/205 degrees as well as 65/245 degrees between polar angles of 60 degrees and 80 degrees, as shown in FIGS. 6 and 7. In the following description, assuming that the azimuth angles of 25 and 65 degrees are plus sides is and the opposite azimuth angles of 205 and 245 degrees are minus sides, the range of combinations of pre-tilt angle $\theta c2$ and the rotational angle $\theta 1$ of the slow axis of the optical compensation film 118 is obtained for the directions of the azimuth angles of 25/205 degrees and the azimuth angles of 65/245 degrees, each of the combinations achieving a ratio of 1.2 or below between the peak luminance of the plus side and the peak luminance of the minus side.

Figure 8:
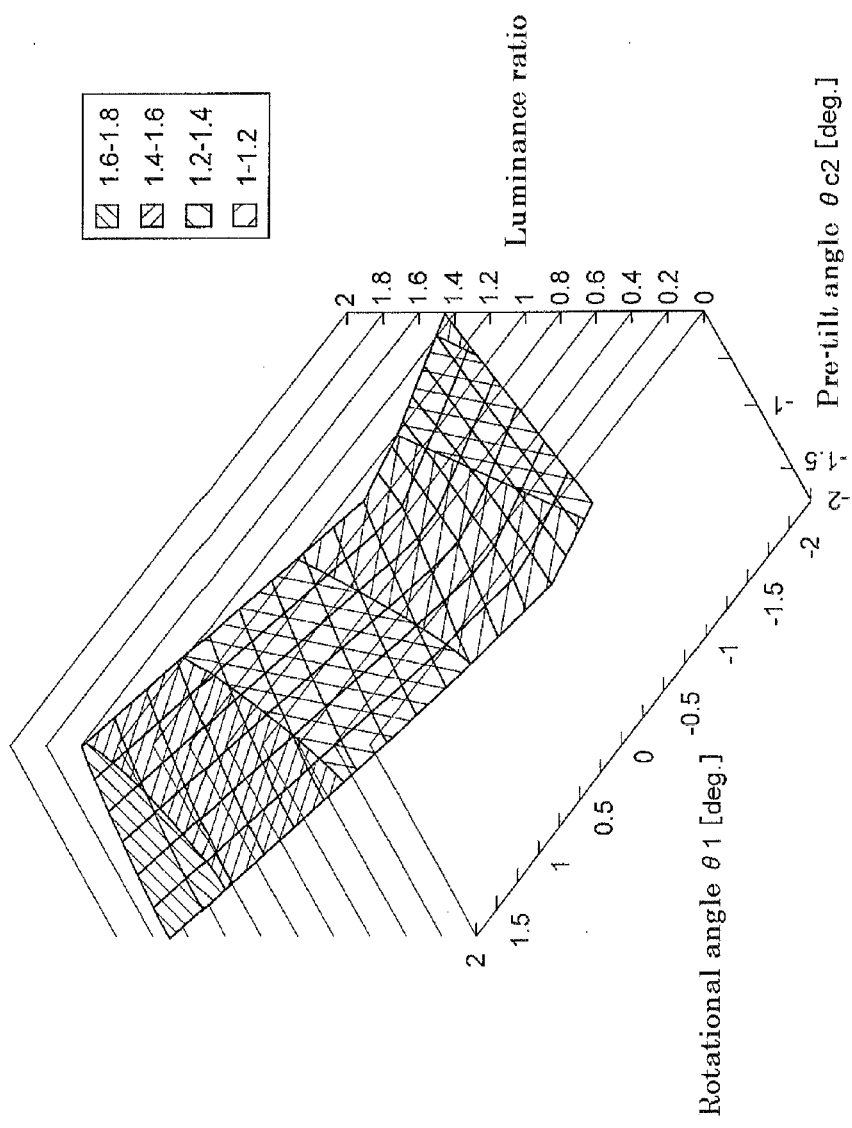
FIG. 8 is a three-dimensional graph obtained by a simulation for LCD device of FIG. 1, showing the relationship in a specific direction between the luminance ratio and the combination of pre-tilt angle and rotational angle of the optical elastic axes of the optical compensation film.

FIG. 8 shows the relationship between the combination of the pre-tilt angle and the rotational angle θ 1 and the luminance ratio as a three-dimensional graph, obtained by a simulation. In this simulation, by changing the pre-tilt angle θ c2 of the LC molecules on the CF substrate 104 between −2 degrees and −0.5 degrees, and changing the rotational angle θ 1 of the slow axis of the optical compensation film 118 between −2 degrees and +2 degrees, the ratio of the peak luminance in the plus side to the peak luminance in the minus side in the direction of the azimuth directions of 25/205 degrees is obtained for each of the combinations of the pre-tilt angle and the rotational angle θ 1. As for the optical compensation film 118, an optical compensation film having optical characteristics wherein $0<(nx-nz)/(nx-ny) \leq 0.5$ and $(nx-ny) \times d=130$ nm was used.

Figure 9:
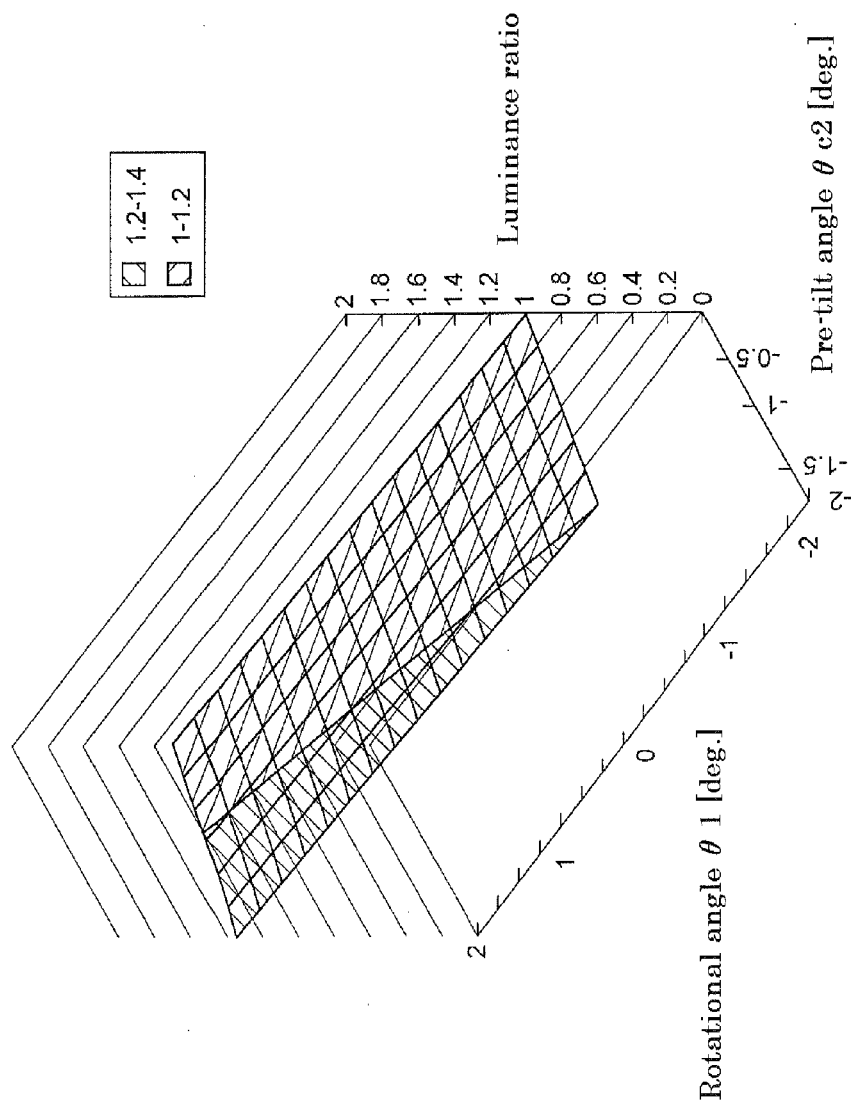
FIG. 9 is another three-dimensional graph obtained by a simulation, showing the relationship in another specific direction between the luminance ratio and the combination of pre-tilt angle and rotational angle of the optical elastic axes of the optical compensation film.

FIG. 9 shows the relationship between the combination of the pre-tilt angle and the rotational angle θ 1 and the luminance ratio as a three-dimensional graph, obtained by a simulation. In this simulation, by changing the pre-tilt angle of the LC molecules on the CF substrate 104 between −2 degrees and −0.5 degrees, and changing the rotational angle θ 1 of the slow axis of the optical compensation film 118 between −2 degrees and +2 degrees, similarly to FIG. 8, the ratio of the peak luminance in the plus side to the peak luminance in the minus side is obtained in the direction of the azimuth angles of 65/245 degrees for each of the combinations of the pre-tilt angle and the rotational angle θ 1.

The boundary between the range which achieves a luminance ratio of 1.2 or below and the range which provides a luminance ratio above 1.2 in each of the simulation results shown in FIGS. 8 and 9 is approximated by a linear expression. In addition, the boundaries obtained from FIG. 8 and FIG. 9 are overlapped in a common plane and shown in FIG. 10.

Figure 10:
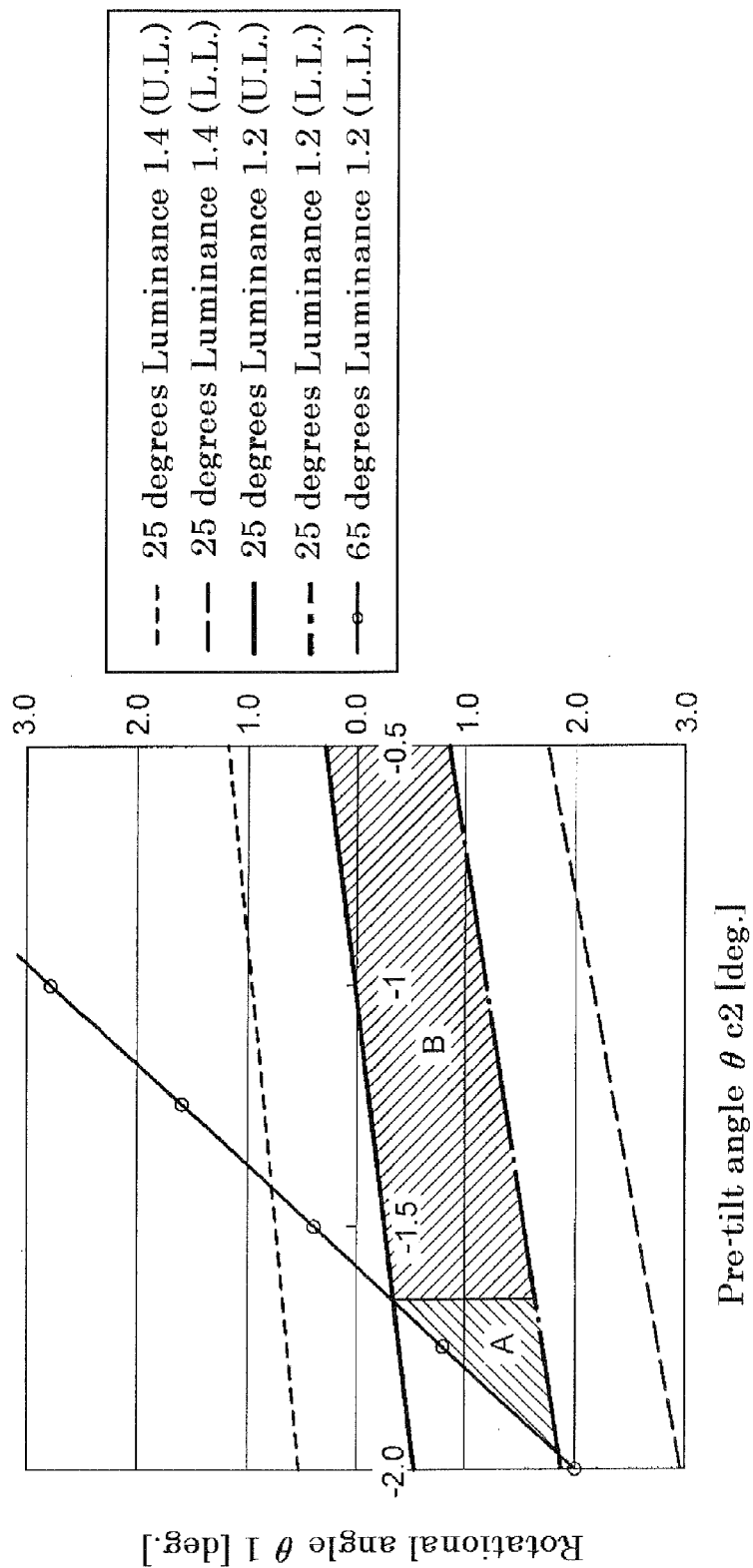
FIG. 10 is a graph obtained by overlapping on a plane the results shown in FIG. 8 and the results shown in FIG. 9.

In FIG. 10, the range achieving a luminance ratio of 1.2 or below in the direction of the azimuth angles of 25/205 degrees is expressed by the pre-tilt angle θ c2 and the rotational angle θ 1 of the slow axis of s the optical compensation film 118, as follows:

$$0.661 \times \theta\, c2 - 0.554 \leq \theta\, 1 \leq 0.524 \times \theta\, c2 + 0.524 \quad (1).$$

On the other hand, the range achieving a luminance ratio of 1.2 or below in the direction of the azimuth angles of 65/245 degrees is expressed as follows;

$$\theta\, 1 \leq 4.76 \times \theta\, c2 + 7.54 \quad (2).$$

Thus, if the combination of the pre-tilt angle and the rotational angle θ 1 of the slow axis of the optical compensation film 118 satisfies the relationships (1) and (2), that is, if the combination falls within the hatched areas A and B in FIG. 10, then the luminance ratio can be lowered to or below 1.2 in the directions of the azimuth angles of 25/205 and 65/245 degrees. The hatched areas A and B can be expressed using the pre-tilt angle θ c2 and the rotational angle θ 1 of the slow axis of the optical compensation film 118, as shown below.

Hatched area A is expressed by:

$$0.661 \times \theta\, c2 - 0.554 \leq \theta\, 1 \leq 4.76 \times \theta\, c2 + 7.54 \quad (3),$$

for the range of θ c2 satisfying $-1.95 \leq \theta\, c2 < -1.65$,

Hatched area B is expressed by:

$$0.661 \times \theta\, c2 - 0.544 \leq \theta\, 1 \leq 0.524 \times \theta\, c2 + 0.524 \quad (4),$$

for the range of θ c2 satisfying $-1.65 \leq \theta\, c2 \leq -0.5$.

In the present embodiment, the rotation of the optical elastic axes nx and nz of the optical compensation film 118 by a rotational angle θ 1 reduces the difference of the retardation in the top-bottom direction caused by the pre-tilt angle of the LC molecules. This reduces the asymmetry in the viewing angle characteristic, and thus improves the contrast-to-viewing angle characteristic of the LCD device. In addition, setting the combination of the pre-tilt angle θ c2 and the rotational angle θ 1 to fall within the above hatched areas A and B reduces the luminance ratio down to 1.2 or below, thereby reducing the asymmetry in the leakage light down to a level at which the observer disregards the asymmetry.

Figure 11:
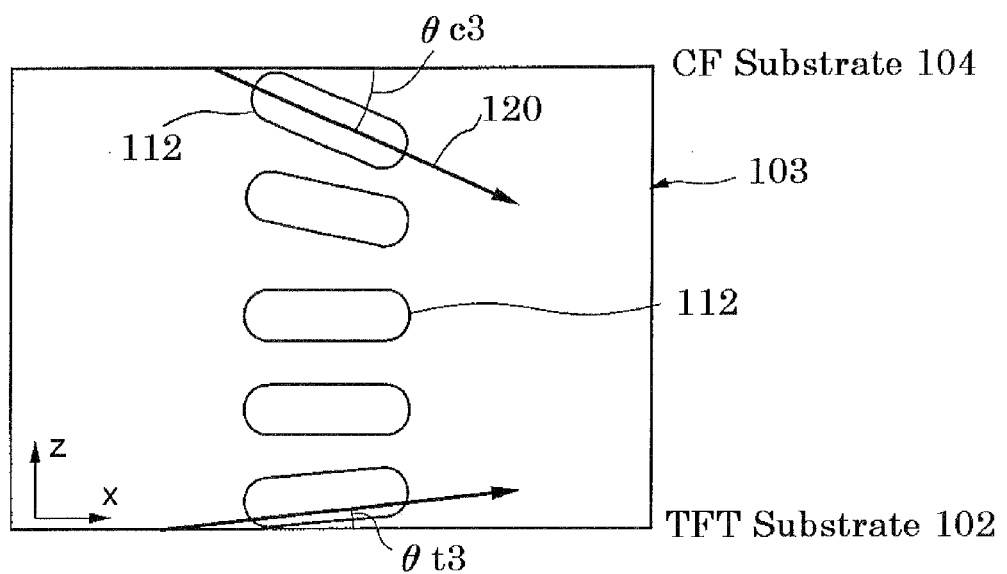
FIG. 11 is a schematic sectional view of the LCD device according to a second embodiment of the present invention for s showing the pre-tilt angles of the LC molecules.
Figure 12:
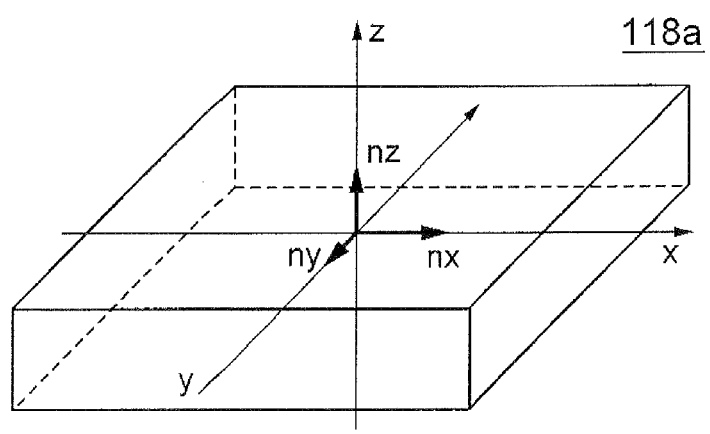
FIG. 12 is a schematic perspective view of the optical compensation film in the LCD device of FIG. 11 for showing the optical characteristics thereof.

An LCD device according to a second embodiment of the present invention has a structure such as shown in FIG. 1. The LCD device of the present embodiment is different from the first embodiment in the orientation of the LC molecules 112 and the optical is characteristic of the optical compensation film 118. FIG. 11 shows the orientation of the LC molecules in the LCD device of the present embodiment. In FIG. 11, the LC molecules 112 rise from the surface of the TFT substrate 102 in the positive rotational direction to a pre-tilt angle θ t3, wherein $0<\theta\, t3<2$ degrees, and rise from the surface of the CF substrate 104 in the negative rotational direction to a pre-tilt angle θ c3. FIG. 12 shows the optical characteristic of the optical compensation film 118 in the present embodiment, wherein the optical compensation film 118 has three optical elastic axes nx, ny and nz which coincide with the X-, Y- and Z-axes, respectively.

Simulations were conducted for the LCD device of the present embodiment to obtain the area of the combinations of the pre-tilt angle θ t3 on the TFT substrate and the pre-tilt angle θ c3 on the CF substrate, the combinations achieving suppression of the asymmetry of the leakage light down to a satisfactory level at which the observer disregards the asymmetry. In the simulations, the combination of the pre-tilt angle θ t3 on the TFT substrate and the pre-tilt angle θ c3 on the CF substrate were determined, the combination providing 1.2 or below for the ratio of the peak luminance in the positive side to the peak luminance in the negative side in the directions of the azimuth angles of 25/205 degrees and the azimuth angles of 65/245 degrees. As for the optical compensation film 118, an optical compensation film having optical characteristics wherein $0 \leq (nx-nz)/(nx-ny) \leq 0.5$ and $(nx-ny) \times d=130$ nm was employed.

Figure 13:
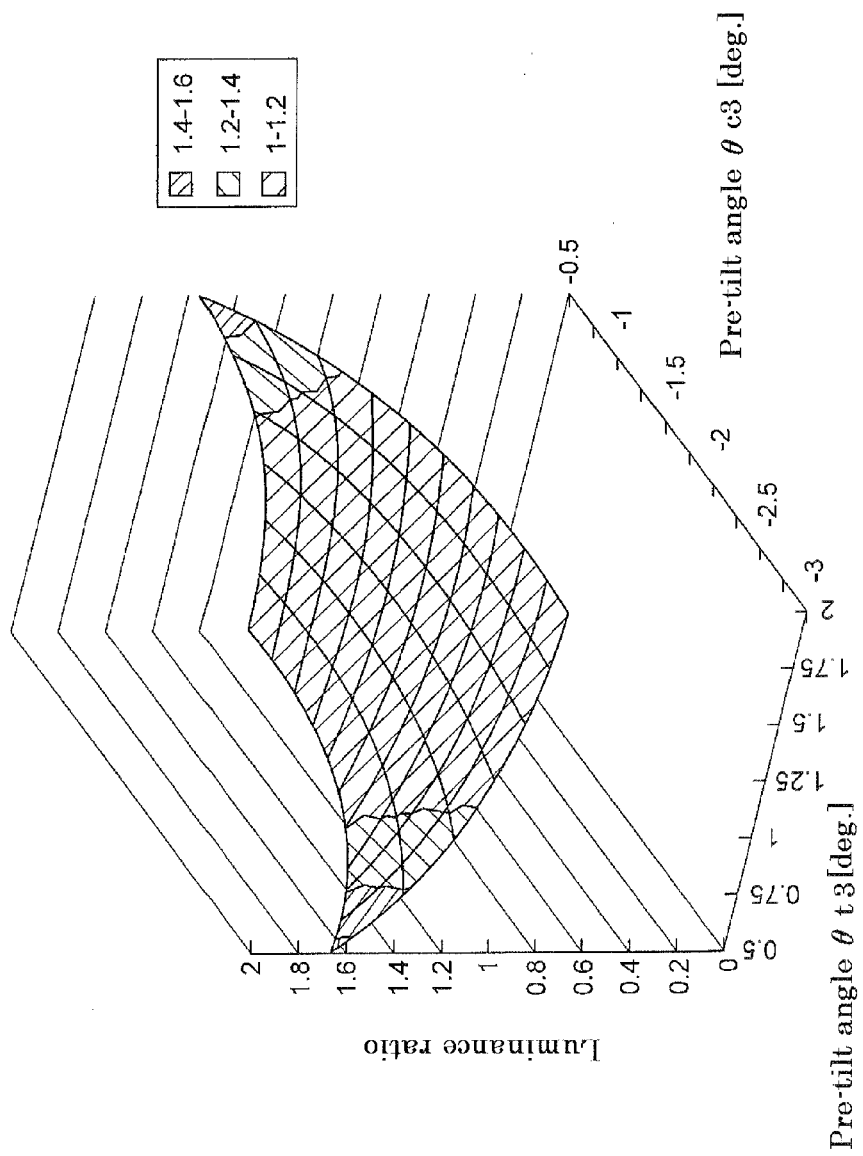
FIG. 13 is a three-dimensional graph obtained by a simulation for the second embodiment, showing the relationship in a specific direction between the luminance ratio and the combination of pre-tilt angle on the TFT substrate and the pre-tilt angle on the CF substrate.
Figure 14:
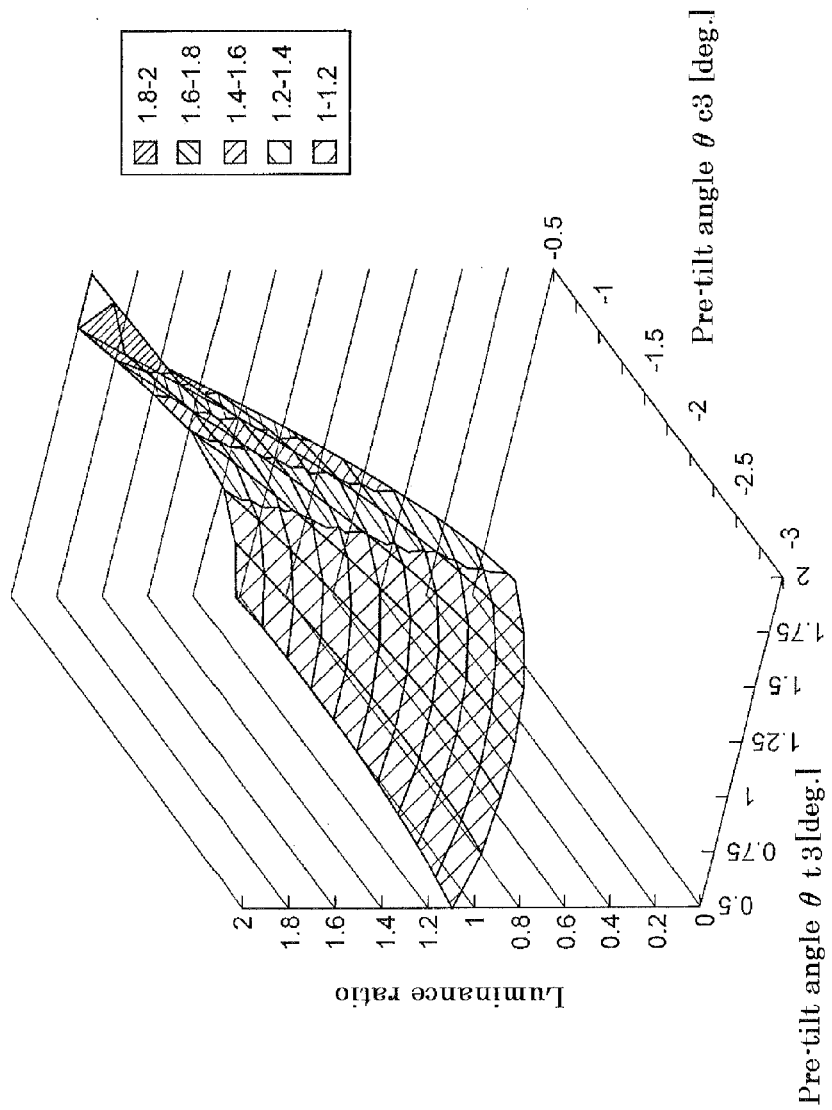
FIG. 14 is another three-dimensional graph obtained by a simulation, showing the relationship in another specific direction between the luminance ratio and the combination of pre-tilt angle on the TFT substrate and the pre-tilt angle on the CF substrate.
Figure 16A:
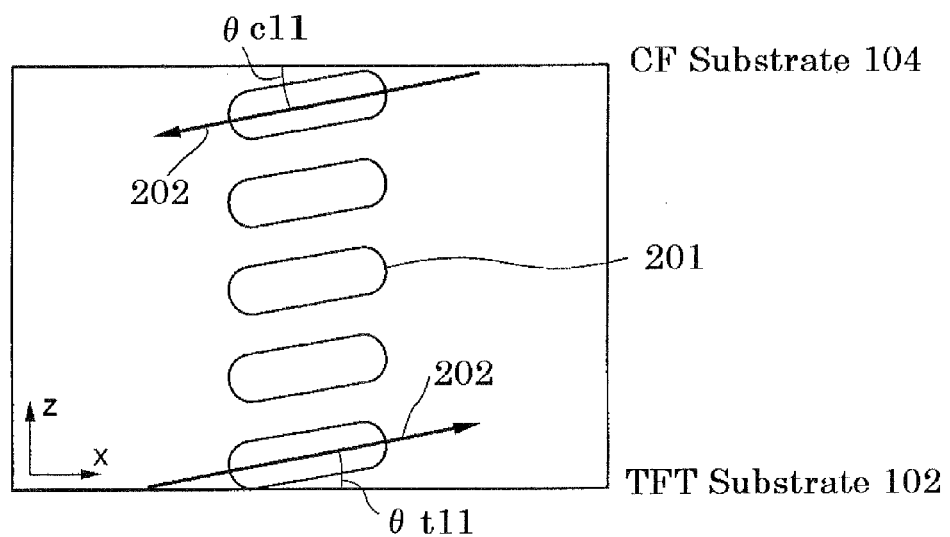
FIG. 16A is a schematic sectional view of a conventional IPS mode LCD device having an anti-parallel-oriented LC layer.
Figure 16B:
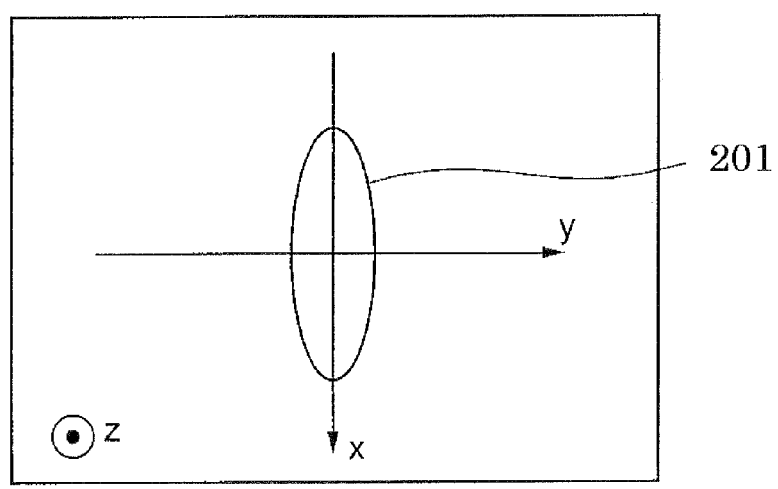
FIG. 16B is a front view of the LC molecules in the LC layer shown in FIG. 16A.

FIG. 13 shows the relationship between the combination of the pre-tilt angle θ t3 and the pre-tilt angle θ c3 and the luminance ratio in the direction of azimuth angles 25/205 degrees as a three-dimensional graph, obtained by the simulations. FIG. 14 shows the relationship between the combination of the pre-tilt angle θ t3 and the pre-tilt angle θ c3 and the luminance ratio in the direction of the azimuth angles 65/245 degrees as a three-dimensional graph, obtained by the simulations.

The boundary between the area achieving a luminance ratio of 1.2 or below and the area providing a luminance ratio above 1.2 was approximated by a linear expression in each of the graphs shown in FIGS. 13 and 14. In addition, the boundaries are overlapped in a common plane and shown in FIG. 15. In FIG. 15, the area achieving a luminance ratio of 1.2 or below in the direction of the azimuth angle of 25 degrees is expressed using the pre-tilt angle θ t3 and pre-tilt angle θ c3, as follows:

$$-1.51 \times \theta\, t3 - 1.23 \leq \theta\, c3 \leq -0.999 \times \theta\, t3 + 0.936 \quad (5).$$

Similarly, the area achieving a luminance ratio of 1.2 or below in the direction of the azimuth angle of 65 degrees is expressed by:

$$\theta c3 \leq -2.42 \times \theta t3 + 1.82 \quad (6).$$

Thus, if the combination of the pre-tilt angle θ t3 on the TFT substrate 102 and the pre-tilt angle θ c3 on the CF substrate 104 satisfies the relationships (5) and (6), that is, if the combination falls within the hatched areas C and D in FIG. 15, then a luminance ratio of 1.2 or below can be achieved in both the directions of the azimuth angles of 25/205 degrees and the azimuth angles of 65/1245 degrees. The hatched areas C and D in FIG. 15 can be expressed by the pre-tilt angle θ t3 and the pre-tilt angle θ c3, as shown below.

Hatched area C is expressed by:

$$-1.51 \times \theta t3 - 1.23 \leq \theta c3 \leq -0.999 \times \theta t3 + 0.936 \quad (7),$$

for the range of θ t3 satisfying 0.500 ≦ θ t3 ≦ 0.625.

Hatched area D is expressed by:

$$-1.51 \times \theta t3 - 1.23 \leq \theta c3 \leq -0.242 \times \theta t3 + 1.82 \quad (8),$$

for the range of θ t3 satisfying 0.625 ≦ θ t3 ≦ 2.0.

In the present embodiment, the LC molecules rise from the surface of the TFT substrate 102 to a pre-tilt angle θ t3, and rise from the surface of the CF substrate to a pre-tilt angle θ c3. If both the pre-tilt angles θ t3 and θ c3 are different from one another, the optical elastic axes of the LC molecules as observed from the TFT substrate 102 toward the CF substrate 104 deviate from the Z-axis by an angle corresponding to the difference between the pre-tilt angles θ t3 and θ c3. Thus, the difference of the retardation in the top-bottom direction caused by the pre-tilt angles of the LC layer can be reduced, similarly to the case of the first embodiment wherein the optical elastic axes of the optical compensation film 118 are rotated by the rotational angle θ 1, thereby suppressing the asymmetry of the viewing angle characteristic. In addition, setting the combination of the pre-tilt angle θ t3 and the pre-tilt angle θ c3 to fall within the hatched areas C and D provides a peak luminance ratio of 1.2 or below for the opposite directions. This reduces the asymmetry in the leakage light down to a level at which the observer disregards the asymmetry.

Since the above embodiments are described only for examples, the present invention is not limited to the above embodiments and various modifications or alterations can be easily made therefrom by those skilled in the art without departing from the scope of the present invention.

What is claimed is:

1. A liquid crystal display (LCD) device comprising a liquid crystal (LC) layer, first and second substrates sandwiching therebetween said liquid crystal layer, and an optical compensation film disposed adjacent to said second substrate, wherein:
    said first substrate mounts thereon electrodes for applying to said LC layer an electric field parallel to said first substrate;
    said LC layer has a twisted angle of substantially zero degree, and includes LC molecules which have longer optical axes extending parallel to said first substrate;
    said LC layer has a positive pre-tilt angle θ p1 on a substrate surface of said first substrate and a negative pre-tilt angle −θ p1 on a substrate surface of said second substrate;
    said optical compensation film has three optical elastic axes including a fast axis extending along a Y-axis, a slow axis extending along a direction which is rotated from an X-axis by a positive rotational angle θ s, and another axis extending along a thickness direction of said optical compensation film which is rotated from a Z-axis by said positive rotational angle θ s; and
    said X-axis has a positive direction which substantially coincides with a projection of a rising direction of said longer optical axes of said LC molecules rising from said substrate surfaces upon display of a black color, said projection being projected on one of said substrate surfaces, said Y-axis has a positive direction which substantially coincides with a direction rotated from said X-axis by an angle of 90 degrees in a counter-clockwise direction as viewed from a front side of said LCD device, said Z-axis has a positive direction which substantially coincides with a direction as viewed normal to said substrate surfaces from said first substrate toward said second substrate, and said positive rotational direction coincides with a counter-clockwise direction as viewed from a negative side of said Y-axis toward a positive side of said Y-axis.

2. The LCD device according to claim 1, wherein said positive rotational angle θ s satisfies the following relationship:

$$0.661 \times \theta p1 - 0.544 \leq \theta s \leq 4.76 \times \theta p1 + 7.54,$$

for the range of said pre-tilt angle θ p1 satisfying −1.95 ≦ θp1 < −165; and $$0.661 \times \theta p1 - 0.544 \leq \theta s \leq 0.524 \times \theta p1 + 0.524,$$

for the range of said pre-tilt angle θ p1 satisfying −1.65 ≦ θ p1 ≦ −0.5.

3. The LCD device according to claim 1, wherein said optical compensation film has optical characteristics:

$$0 < (nx-nz)/(nx-ny) \leq 0.5; \text{ and}$$

$$94\text{nm} \leq (nx-ny) \times d \leq 214\text{nm}$$

where nx, ny and nz are refractive indexes of said slow axis, said fast axis and said another axis, respectively, of said optical compensation film.

4. The LCD device according to claim 1, wherein a ratio of a peak luminance of leakage light as observed in one azimuth direction upon display of a black color to a peak luminance of said leakage light as observed in another azimuth direction opposite to said one azimuth direction upon display of said black color is equal to or below 1.2.

5. A liquid crystal display (LCD) device comprising a liquid crystal (LC) layer, first and second substrates sandwiching therebetween said liquid crystal layer, and an optical compensation film disposed adjacent to said second substrate, wherein:
    said first substrate mounts thereon electrodes for applying to said LC layer an electric field parallel to said first substrate;
    said LC layer has a twisted angle of substantially zero degree, and includes LC molecules which have longer optical axes extending parallel to said first substrate;
    said LC layer has a positive pre-tilt angle θ p2 on a substrate surface of said first substrate and a negative pre-tilt angle θ p3 on a substrate surface of said second substrate;
    said optical compensation film has three optical elastic axes including a fast axis extending along a Y-axis, a slow axis extending along an X-axis, and another axis in a thickness direction of said optical compensation film extending along a Z-axis; and said X-axis has a positive direction which substantially coincides with a projection of a rising direction of said longer optical axes of said LC molecules rising from said substrate surfaces upon display of a black color, said projection being projected on one of said substrate surfaces, said Y-axis has a positive direction which substantially coincides with a direction rotated from said X-axis by an angle of 90 degrees in a counter-clockwise direction as viewed from a front side of said LCD device, said Z-axis has a positive direction which substantially coincides with a direction as viewed normal to said substrate surfaces from said first substrate toward said second substrate, and said positive rotational direction coincides with a counter-clockwise direction as viewed from a negative side of said Y-axis toward a positive side of said Y-axis.

6. The LCD device according to claim 5, wherein said negative pre-tilt angle $\theta\ p3$ satisfies the following relationship:

$$-1.51 \times \theta\ p2 - 1.23 \leq \theta\ p3 \leq -0.999 \times \theta\ p2 + 0.936,$$

for the range of said positive pre-tilt angle $\theta\ p2$ satisfying $0.500 \leq \theta\ p2 < 0.625$; and $$-1.51 \times \theta\ p2 - 1.23 \leq \theta\ p3 \leq -2.42 \times \theta\ p2 + 1.82,$$

for the range of said positive pre-tilt angle $\theta\ p2$ satisfying $0.625 \leq \theta\ p2 \leq 2.0$.

7. The LCD device according to claim 5, wherein said optical compensation film has optical characteristics:

$$0 < (nx-nz)/(nx-ny) \leq 0.5;\ \text{and}$$

$$94\text{nm} \leq (nx-ny) \times d \leq 214\text{nm}$$

where nx, ny and nz are refractive indexes of said slow axis, said fast axis and said another axis, respectively, of said optical compensation film.

8. The LCD device according to claim 5, wherein a ratio of a peak luminance of leakage light as observed in one azimuth direction upon display of a black color to a peak luminance of said leakage light as observed in another azimuth direction opposite to said one azimuth direction upon display of said black color is equal to or below 1.2.

* * * * *